Figure 1:
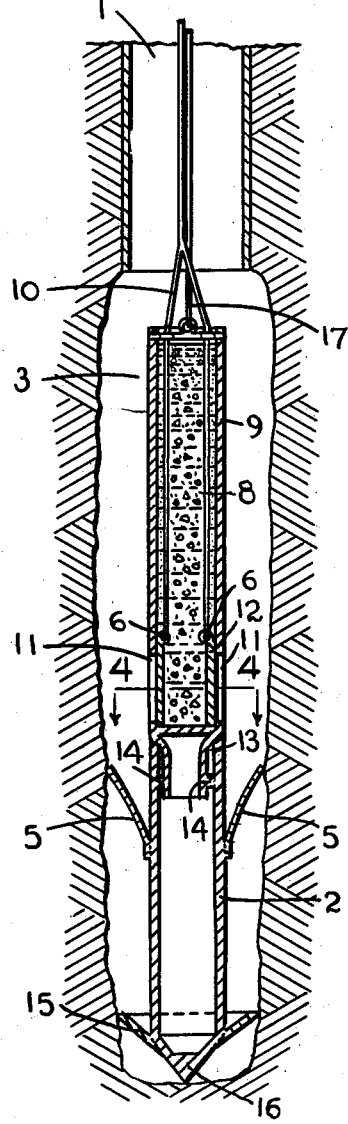

Sept. 5, 1944.  H. H. HOLMES  2,357,589
OIL WELL FILTER
Original Filed Oct. 22, 1941

Inventors
Harrison H. Holmes
Walter E. Lawson

By Robert V. Ball
Agent

Patented Sept. 5, 1944

2,357,589

UNITED STATES PATENT OFFICE 2,357,589

OIL WELL FILTER

Harrison H. Holmes, Woodbury, N. J., and Walter E. Lawson, Wilmington, Del., assignors to E. I. du Pont de Nemours & Company, Wilmington, Del., a corporation of Delaware Original application October 22, 1941, Serial No. 416,020. Divided and this application July 21, 1942, Serial No. 451,720

1 Claim. (Cl. 166—1)

The present invention relates to the art of petroleum production, and in particular to a process for forming oil well filters of porous cement.

This application is a division of Serial No. 416,020, filed October 22, 1941.

Contrary to expectation, the problem of forming such a filter in place from porous cement differs markedly from that of preparing gravel pack filters or the like. This difference is due to certain peculiar properties of the porous cement grout prior to setting. For instance it is characteristic of this material that it cannot be set under water. Furthermore, it must be kept out of contact with water prior to reaching its ultimate position in the well. This is necessary to prevent flushing of the cement in the grout from the pore-forming aggregate therein. Contact with water is to be avoided, especially with respect to porous cement grouts containing included oil or other oleaginous ingredients as disclosed and claimed in copending application Serial No. 309,899, filed December 18, 1939.

These and other difficulties necessitate the development of special methods and equipment for forming oil well filters from porous cement.

The object of the present invention is a new and improved arrangement for forming porous cement filters in oil wells. Additional objects will be appreciated from the following detailed description of the invention.

According to this invention, a drillable liner is disposed at the base of the well to provide a pumping cavity. The liner is centered at several points such as by fingers which follow downwards and engage the wall of the borehole as on a ratchet, so that the section of the liner cannot move upwards. These fingers are provided with means for tripping after the liner is down and disposed in its final location. The centering devices must be made so that they will not cause bridging. The liner is closed at the top with any convenient drillable plug, preferably of wood.

Once the section of the liner is in place, the porous cement grout, preferably containing sized aggregate, cement, water and oil, is lowered into place in the annular space surrounding the liner, between the latter and the well wall.

Where water is present in the well, it should be removed by bailing prior to placing the cement. If a steady flow of water is encountered it may be desirable to fill the well with oil after bailing out the water present so that the weight of the column of oil will prevent entrance of more water.

The invention may be appreciated more readily by referring to the attached drawing.

Figure 2:
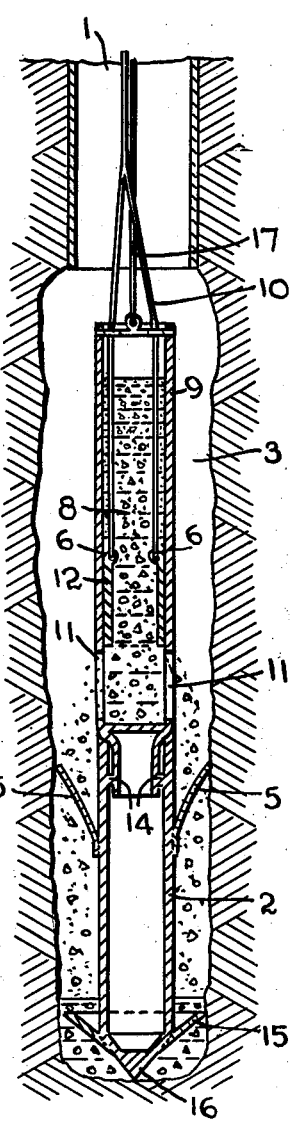
Figure 3:
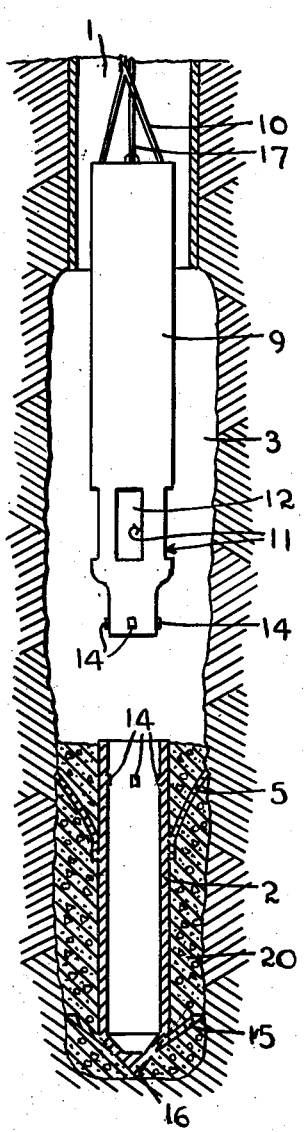
Figure 4:
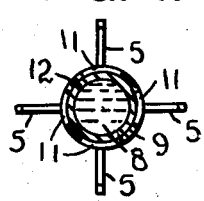

Figure 1 is a side view in cross-section of the well with the drillable liner and attached dump bailer placed in position at the bottom of the well. Figure 2 is a similar view of the same elements in different arrangement. Figure 3 is a side view partly in cross-section and partly in perspective of the same elements after the bailer is pulled away from the liner. Figure 4 is a sectional view on the line 4—4 of Figure 1.

Similar numerals refer to similar parts throughout the several views.

The sides of the well are defined by the casing 1, below which is the borehole 3. Referring to Figures 1 and 4, at the bottom of the well is disposed the section of drillable liner 2 which is joined by means of telescope joint 13 and shear pins 14 to the dump bailer 9 of special design containing the porous cement grout 8. The drillable liner 2 and attached bailer 9 are maintained in position by centering fingers 5 attached to the drillable liner and engaging the wall of the borehole. Slots 11 in the side of the bailer are closed by the sleeve valve closure 12. The umbrella device 15 is disposed in the region of the conical end 16 to prevent floating. The conventional tripping device 10, which as illustrated in Figure 1 is a pair of cables attached to the top of sleeve 12 at points 6 and 6, raises the sleeve 12 (as illustrated in Figure 2) and thus permits the cement grout 8 to flow out of slots 11 and about the drillable liner 2. When the cement has set sufficiently to hold the liner in position, the bailer is pulled away (as illustrated in Figure 3) by breaking the shear pins 14.

The method of operation is as follows: With the slots 11 closed by sleeve 12 as shown in Figure 1, the dump bailer which is attached to the drillable liner 2 as illustrated in Figure 1 is filled with porous cement grout 8, and the ensemble is lowered by means of lowering cable 17 to the bottom of the well; centering fingers 5 following downward and engaging the wall of the borehole 3. When the liner and attached bailer are in position at the bottom of the well as illustrated in Figure 1, the sleeve 12 is raised by means of the tripping device 10 and the cement grout 8 flows through the slots 11 down and about the drillable liner 2, as illustrated in Figure 2. When the cement has set sufficiently to hold the liner in position the bailer 9 is raised by means of cable 17, breaking the shear pins 14. There is thus obtained a drillable liner 2 fixed in position by and surrounded by porous concrete 20.

The liner may be drilled out or otherwise removed to leave a porous cement filter with pumping cavity.

This invention is characterized by the advantage that it permits a facile and efficient arrangement for forming porous cement oil well filters.

In addition to the foregoing embodiment it will be appreciated that many variations of the same may be devised within the scope of the present invention as described. For instance, although we have spoken of a drillable liner in the foregoing, the invention is applicable as well to any type of removable liner including one that can be dissolved or broken down by other chemical means, as described in our copending application Serial No. 416,020, filed October 22, 1941.

We intend to be bound only by the following patent claim.

We claim:

Apparatus for forming a porous cement oil well filter, including a drillable liner, a dump bailer, a telescope joint joining said liner and bailer, shear pins fixing said joint in place, at least one slot in the side of the bailer, a sleeve valve closure for said slot and a tripping device adapted to raise said sleeve to dump cement, whereby porous cement grout may be poured about said liner and the bailer may be severed from the liner by breaking the shear pins after the cement sets, holding the liner in position.

HARRISON H. HOLMES.
WALTER E. LAWSON.